(12) United States Patent
Awheda et al.

(10) Patent No.: US 10,839,281 B2
(45) Date of Patent: Nov. 17, 2020

(54) SMART RFID ELECTRICAL UNIT SYSTEM

(71) Applicants: Mostafa D. Awheda, Ottawa (CA); Abdulhadi E. Abdulhadi, Ottawa (CA)

(72) Inventors: Mostafa D. Awheda, Ottawa (CA); Abdulhadi E. Abdulhadi, Ottawa (CA)

(*) Notice: Subject to any disclaimer, the term of this patent is extended or adjusted under 35 U.S.C. 154(b) by 66 days.

(21) Appl. No.: 16/278,484

(22) Filed: Feb. 18, 2019

(65) Prior Publication Data
US 2019/0180163 A1  Jun. 13, 2019

Related U.S. Application Data

(63) Continuation of application No. PCT/CA2017/000199, filed on Aug. 25, 2017.

(30) Foreign Application Priority Data

Aug. 30, 2016  (CA) .................................... 2940467

(51) Int. Cl.
*G06K 19/077* (2006.01)
*H02J 13/00* (2006.01)
*G06K 19/07* (2006.01)

(52) U.S. Cl.
CPC ... *G06K 19/07775* (2013.01); *G06K 19/0716* (2013.01); *G06K 19/0723* (2013.01); *G06K 19/0725* (2013.01); *H02J 13/0075* (2013.01); *H02J 13/00* (2013.01); *Y02B 90/2653* (2013.01); *Y04S 40/126* (2013.01)

(58) Field of Classification Search
None
See application file for complete search history.

(56) References Cited

U.S. PATENT DOCUMENTS

| | | | |
|---|---|---|---|
| 9,207,699 B2* | 12/2015 | Takizawa | B41J 29/38 |
| 9,569,647 B2* | 2/2017 | Allen | H04L 12/2809 |
| 9,983,646 B2* | 5/2018 | Mullen | H02J 7/00047 |
| 2007/0155349 A1* | 7/2007 | Nelson | H02J 13/0013 455/128 |
| 2010/0010643 A1* | 1/2010 | Pomerantz | H04B 3/54 700/22 |
| 2010/0152912 A1* | 6/2010 | Huang | H01R 13/665 700/295 |
| 2010/0264752 A1* | 10/2010 | Wong | 307/116 |

(Continued)

*Primary Examiner* — Christle I Marshall
(74) *Attorney, Agent, or Firm* — Barry Hutsel; Moffat & Co.

(57) ABSTRACT

A smart radio frequency identification (RFID) system for controlling operation of electrical units is disclosed. The system includes a RFID tag, a control unit coupled to the RFID tag, a relay unit connected to the control unit and to the electrical unit, and an external RFID reader for generating radio frequency (RF) signals for sending data to the RFID tag when the RFID reader is placed next to the RFID tag. The RFID tag checks and stores the data and passes the data along to the control unit. The control unit sends a control signal to the relay unit in accordance with instructions contained in the data, causing the relay unit to operate the electrical unit between a first state and a second state. The system may also include sensors to monitor certain conditions of the electrical unit and cause the control unit to turn off the electrical unit when the conditions are abnormal.

20 Claims, 3 Drawing Sheets

(56) References Cited

U.S. PATENT DOCUMENTS

| | | | |
|---|---|---|---|
| 2015/0326020 A1* | 11/2015 | Lichter | H02J 3/14 307/39 |
| 2018/0026404 A1* | 1/2018 | Geo | H04W 88/04 439/620.21 |
| 2020/0005002 A1* | 1/2020 | Schmidt, Jr. | H01R 13/465 |

* cited by examiner

SMART RFID ELECTRICAL UNIT SYSTEM

FIELD

The invention relates to electrical units such as outlets, switches, dimmers, extension cords, USB charging ports, and circuit breakers, and particularly to smart RFID electrical units.

BACKGROUND

Unprotected electrical outlets (wall receptacles and extension cords) that are placed everywhere in buildings may cause serious injuries for children. Young children may experience electric shocks and skin burns when they insert metal objects into unprotected electrical outlets. In addition, most electrical fires are caused by mistakes that homeowners make, such as overloading electrical outlets. Moreover, children always have the access to use traditional outlets and switches even when their parents do not want them to do so. For example, parents usually set a daily (or weekly) schedule for their children for watching TVs and playing with electronic games. However, children often spend more time than scheduled by their parents on using such electronic devices. Parents usually cannot solve these issues because they are unable to deactivate the existing electrical outlets to which these electronic devices are connected. Furthermore, existing outlets, switches, dimmers, and circuit breakers are generally not energy saving. This is because they do not have the ability to shut down the electricity powering the appliances when they are not in use. Most electrical devices consume electricity even when they are turned off. For example, electrical devices that have lights, LCDs, LEDs, or clocks consume electricity while they are turned off.

In the prior art, existing electrical outlets are sometimes protected using plastic covers that are plugged in to cover the holes for safety reasons. However, these types of covers may be damaged due to the repeated use and the environmental factors. In addition, existing electrical outlets do not include an alarm system. Thus, users may forget to return the plastic safety cover back to the electrical outlet when the electrical device is unplugged. To overcome the problem of safety, some electrical outlets (receptacles) incorporate two identical sliding blocks below their two holes. These identical sliding blocks are only moving together. As such, if one metal object is inserted into only one hole, the receptacle will be blocked. However, the receptacle will be unprotected, if the children are able to insert two metal objects into the holes of the receptacle at the same time.

Smart protected electrical outlets have been also developed by incorporating Bluetooth and WiFi technology. Then the users are able to turn ON/OFF, or set a timer for ON and OFF to electrical outlets by using their smart devices. Wall receptacles and extension cords are located everywhere in homes. As such, to pair homeowner's smart phone with the smart Bluetooth electrical outlets, the Bluetooth devices that are integrated in these electrical outlets will broadcast all the time and even when the electrical outlets are not active (OFF, no appliances are connected). Thus, strong interference will be experienced by Bluetooth and wireless devices that use Bluetooth technology and WiFi devices. This problem significantly reduces the communication range of the smart devices that are installed in the home. Other problems caused by this interference are slow internet connection and slow data transfer speed over WiFi.

The Bluetooth technology based smart protected electrical outlets are power hungry. As described in the previous paragraph, the smart Bluetooth electrical outlet has to broadcast all the time. In a home with one hundred electrical outlets, for example, there are one hundred Bluetooth devices broadcasting at the same time. This will consume more electrical power. In addition, these smart electrical outlets are equipped with Bluetooth devices that increase the cost of the smart electrical outlets unit. The high cost, and the large consumption of power of the Bluetooth electrical outlets and switches available in the market today limit the widespread use of these electrical units.

Therefore, there is a need for safe and energy saving smart electrical outlets, switches, dimmers, extension cords, USB charging ports, and circuit breakers.

SUMMARY

According to a first broad aspect, there is provided a smart RFID electrical unit system for electrical outlets, switches, dimmers, USB, and circuit breakers; the system comprising an electrical unit (which may be an outlet, a switch, a dimmer, USB, a circuit breaker, or a combination of them) with a connection mechanism having a first state in which the electrical unit is activated (turned ON) and a second state in which the electrical unit is deactivated (turned OFF), an electrical power supply for powering the system with the required AC voltage, an AC-DC voltage converter unit coupled to a voltage regulator unit to provide the system with the required DC voltages, a control unit coupled to a relay unit for controlling the connection mechanism of the electrical unit, a RFID reader (conventional RFID reader or a smart phone) to communicate (send and receive data) with the RFID tag, and a RFID tag for communicating with the RFID reader, waking up the control unit upon the reception of the new data sent by the RFID reader, and exchanging data between the RFID reader and the control unit. Upon receiving data (electromagnetic waves or Radio Frequency signals) from the RFID reader, the RFID tag generates an energy harvesting that powers up its RFID microchip and wakes up the control unit, and thereafter the RFID tag passes data to the control unit. Upon receiving the said data, the control unit sends a control signal (a logic zero voltage or a logic one voltage) to the relay unit. If the control signal received by the relay unit is a logic zero voltage and the normally closed (N.C) contact of the relay is connected to the Hot (Line) wire of the electrical power supply, the relay unit places the electrical unit at the first state (activated); if the control signal received by the relay unit is a logic zero voltage and the normally open (N.O) contact of the relay is connected to the Hot (Line) wire of the electrical power supply, the relay unit places the electrical unit at the second state (deactivated); if the control signal received by the relay unit is a logic one voltage and the normally closed (N.C) contact of the relay is connected to the Hot (Line) wire of the electrical power supply, the relay unit places the electrical unit at the second state (deactivated); if the control signal received by the relay unit is a logic one voltage and the normally open (N.O) contact of the relay is connected to the Hot (Line) wire of the electrical power supply, the relay unit places the electrical unit at the first state (activated). Upon activating (or deactivating) the electrical unit, the control unit resets the memory locations of the RFID microchip specified for the control unit to zeros, and returns to operate in the sleeping mode to save power.

According to a second broad aspect, there is provided a control system for controlling a smart RFID electrical unit system (an outlet, a switch, a dimmer, a USB, a circuit breaker, or a combination of them), the electrical unit comprises an electrical power supply for providing the system with the required AC voltage, an AC-DC voltage converter unit coupled to a voltage regulator unit for providing the system with the required DC voltages, and an electrical unit connection mechanism having a first state in which the electrical unit is activated (turned ON) and a second state in which the electrical unit is deactivated (turned OFF), the control system comprising a RFID reader (conventional RFID reader or a smart phone) to communicate (send and receive data) with the RFID tag, and a RFID tag to communicate with the RFID reader and to wake up the control unit upon the reception of the new data sent by the RFID reader and to exchange data between the RFID reader and the control unit, a relay unit adapted to place the electrical unit in one of the first state and the second state, a control unit adapted to send a control signal to the relay unit and to be woken up by the energy harvesting generated by the RFID tag when tapped by the RFID reader. Upon receiving data (electromagnetic waves or Radio Frequency signals) from the RFID reader, the RFID tag generates an energy harvesting which activates the RFID microchip of the RFID tag and wakes up the control unit, and then the RFID tag passes the said data to the control unit. Upon receiving the said data, the control unit sends a control signal (a logic zero voltage or a logic one voltage) to the relay unit. If the control signal received by the relay unit is a logic zero voltage and the normally closed (N.C) contact of the relay is connected to the Hot (Line) wire of the electrical power supply, the relay unit places the electrical unit at the first state (activated); if the control signal received by the relay unit is a logic zero voltage and the normally open (N.O) contact of the relay is connected to the Hot (Line) wire of the electrical power supply, the relay unit places the electrical unit at the second state (deactivated); if the control signal received by the relay unit is a logic one voltage and the normally closed (N.C) contact of the relay is connected to the Hot (Line) wire of the electrical power supply, the relay unit places the electrical unit at the second state (deactivated); if the control signal received by the relay unit is a logic one voltage and the normally open (N.O) contact of the relay is connected to the Hot (Line) wire of the electrical power supply, the relay unit places the electrical unit at the first state (activated). Upon activating (or deactivating) the electrical unit, the control unit resets the memory locations of the RFID microchip specified for the control unit to zeros, and returns to operate in the sleeping mode to save power.

In accordance with a further broad aspect, there is provided a method for controlling a smart RFID electrical unit system (an outlet, a switch, a dimmer, a USB, and a circuit breaker), the method comprising detecting any data (electromagnetic waves or Radio Frequency signals) sent by the RFID reader to the RFID tag; upon said detection, activating the RFID microchip of the RFID tag and generating energy harvesting that wakes up the control unit coupled to the relay unit from the sleeping mode; upon said waking up, receiving data from the RFID tag and providing a control signal (a logic zero voltage or a logic one voltage) to the relay unit, thereby connecting the Hot (Line) wire of the electrical power supply to one of the relay's contacts (N.C contact or N.O contact); upon said connection, placing the electrical unit in one of the first state and the second state (activating or deactivating the electrical unit); and resetting the memory locations of the RFID microchip specified for the control unit to zeros, and returning the control unit to operate in the sleeping mode to save power and to wait for the next activation of the RFID tag.

In another aspect, there is provided a radio frequency identification (RFID) system for controlling operation of an electrical unit between a first state and a second state, the RFID system comprising: a RFID tag comprising a RFID microchip including memory, at least one antenna for receiving radio frequency (RF) signals, and energy harvesting circuits for generating electrical energy from the RF signals to power the RFID tag, the RF signals including data; a control unit coupled to the RFID tag, the control unit including a microcontroller and memory; a relay unit connected to the control unit and to the electrical unit; and at least one external RFID reader including functionality for generating the RF signals and the data when the RFID reader is placed in close proximity to the RFID tag, wherein the RFID microchip includes functionality for processing the data, saving the data on the memory of the RFID microchip and sending a wakeup signal to the control unit, wherein the control unit includes functionality capable of reading the data from the memory of the RFID microchip, processing the data and sending a control signal to the relay unit in accordance with instructions contained in the data, the relay unit operating the electrical unit between the first state and the second state in response to the control signal.

In a further aspect, there is provided a radio frequency identification (RFID) system for controlling operation of an electrical unit between a first state and a second state, the RFID system comprising: a RFID tag comprising a RFID microchip including memory, at least one antenna for receiving radio frequency (RF) signals, and energy harvesting circuits for generating electrical energy from the RF signals to power the RFID tag, the RF signals including data; a control unit coupled to the RFID tag, the control unit including a microcontroller and memory; a sensor unit connected to the control unit; a relay unit connected to the control unit and to the electrical unit; and at least one external RFID reader including functionality for generating the RF signals and the data when the RFID reader is placed in close proximity to the RFID tag, wherein the RFID microchip includes functionality for processing the data, saving the data on the memory of the RFID microchip and sending a wakeup signal to the control unit, wherein the control unit includes functionality capable of reading the data from the memory of the RFID microchip, processing the data and sending a control signal to the relay unit in accordance with instructions contained in the data, the relay unit operating the electrical unit between the first state and the second state in response to the control signal, wherein the sensor unit includes functionality for monitoring a condition of the electrical unit and for causing the control unit to send the control signal to the relay unit when the condition is deemed to be hazardous, the control signal causing the relay unit to place the electrical unit into the second state, wherein the second state is a turned-off state.

In yet another aspect, there is provided a method for controlling operation of an electrical unit between a first state and a second state, the method comprising: providing a RFID tag comprising a RFID microchip including memory, at least one antenna, and energy harvesting circuits; connecting the RFID tag to a control unit, the control unit including a microcontroller and memory; connecting a relay unit to the control unit and to the electrical unit; generating RF signals using an external RFID reader placed in close proximity to the RFID tag, the RF signals including data; using the energy harvesting circuits to generate electrical energy from the RF signals to power the RFID tag; using the RFID microchip to process the data, save the data on the memory of the RFID microchip, and wake up the control unit, upon waking up, reading the data saved on the memory of the RFID microchip into the memory of the control unit and processing the data in the control unit; sending a control signal from the control unit to the relay unit in response to the data; and operating the electrical unit between the first state and the second state in response to the control signal.

BRIEF DESCRIPTION OF THE DRAWINGS

Referring to the drawings wherein like reference numerals indicate similar parts throughout the several views, several aspects of the smart RFID electrical unit system for controlling the operation of electrical units are illustrated by way of example, and not by way of limitation, in detail in the figures, wherein.

DETAILED DESCRIPTION

Figure 1:
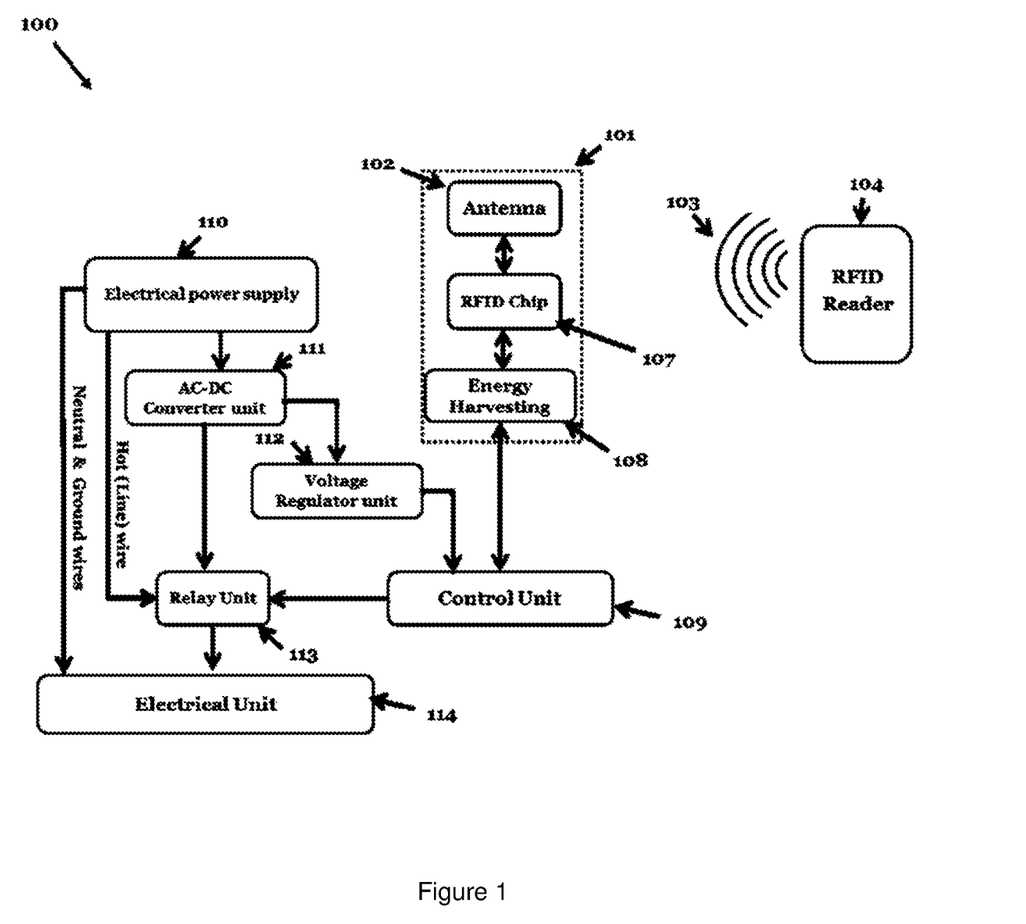
FIG. 1 is a schematic view of the smart RFID electrical unit system for controlling the operation of electrical units in accordance with a first embodiment.

FIG. 1 illustrates one embodiment of the smart RFID electrical unit system 100 for controlling the operation of electrical units (outlets, switches, dimmers, USB charging ports, and circuit breakers). The smart RFID electrical unit system 100 comprises an electrical unit 114 that is activated/deactivated (turned ON or turned OFF) by a control unit 109 through a relay unit 113. The smart RFID electrical unit system 100 further comprises a RFID tag 101, a RFID reader 104 (a conventional RFID reader or a smart phone equipped with near-field communication (NFC)) to communicate (or exchange data) with the RFID tag 101 and the control unit 109, and an electrical power supply 110 connected to an AC-DC voltage converter unit 111 and a voltage regulator unit 112 for providing the system with the required AC and DC voltages.

The RFID tag 101 may be any adequate RFID tag that can be used to communicate with the RFID reader 104. Examples of adequate RFID tags comprise a passive RFID tag, semi-active RFID tag and active RFID tag. The RFID tag 101 is composed of an antenna 102 and a RFID microchip 107. Based on the way the tag is powered, RFID tags 101 can be classified into the three mentioned categories: active, semi-active and passive RFID tags. Active and semi-active RFID tags have their own power source for powering the RFID microchip 107. Because of the internal power source, the manufacturing cost of active and semi-active RFID tags is significantly high. Passive RFID tags do not contain any source supplying power to the microchip. Thus, passive RFID tags are inexpensive. In this invention, the passive RFID tag is implemented in the smart RFID electrical unit system. The RFID tag 101 is integrated within the external frame of the electrical unit 114 (i.e. the RFID tag 101 is integrated with the wall plate of the electrical unit 114). The RFID tag 101 can communicate with the RFID reader 104. When the user taps the RFID tag 101 with their RFID reader 104, or brings the reader sufficiently close to the tag, the RFID tag 101 receives data (through electromagnetic waves or Radio Frequency signals 103) sent by the RFID reader 104. Upon receiving the data, the RFID tag 101 generates an energy harvesting 108 that powers up the RFID microchip 107 and wakes up the control unit 109. Upon powering the RFID microchip 107, the RFID tag 101 checks whether the identification (ID) of the RFID reader 104 contained in the data is on the list of the authorized RFID readers 104 saved on the memory of the RFID microchip 107. If the ID of the RFID reader 104 is valid (i.e. the RFID reader 104 has the authority to communicate with the RFID tag 101), the RFID tag 101 saves the data on the memory of the RFID microchip 107 at locations specified by the RFID reader 104. If the data is saved at the location specified for a password, the RFID tag 101 changes the password used by authorized RFID readers 104; if the data is saved at locations specified for an authorized list, the RFID tag 101 adds a new user to the authorized list of RFID readers 104; if the data is saved at a location specified for activating (or deactivating) the authentication property, the RFID tag 101 activates (or deactivates) the authentication property; if the data is saved at locations specified for the control unit 109, the RFID tag 101 passes the data to the control unit 109 when requested.

The antenna 102 of the RFID tag may be any adequate antenna. Examples of adequate antennas are a loop antenna, a coil antenna, a dipole antenna, a slot antenna, and a patch antenna. Two antennas or multi-port antenna may also be used with this invention. The antenna 102 of the RFID tag 101 plays a very important role in the overall RFID system performance, as it directly impacts the size, cost, and operating range.

The RFID microchip 107 is an integrated circuit IC directly attached to the antenna 102. The RFID microchip 107 comprises an electronic circuit having a modulator, a demodulator, a logical controller, and a memory. The demodulator is used to demodulate commands contained in the data received from the RFID reader 104. The logical controller decodes the RFID reader 104 commands and selects a corresponding response according to RFID communication protocol. The modulator then generates the response to the RFID reader 104 by launching a modulated backscattering signal (MBS) to the antenna 102.

It should be understood that the RFID tag 101 may be integrated with the external frame of the electrical unit 114 (i.e. integrated with the wall plate of the electrical unit 114) in many different ways. For example, both the antenna 102 and the RFID microchip 107 of the RFID tag 101 may be integrated in the external frame of the electrical unit 114. Another configuration may be implemented by integrating the antenna 102 of the RFID tag 101 with the external frame of the electrical unit 114, while the RFID microchip 107 of the RFID tag 101 is integrated with the printed circuit board (PCB) of the system 100 attached to the internal frame of the electrical unit 114.

The electromagnetic wave (Radio Frequency signal) 103 is emitted by the RFID reader 104 (the conventional RFID reader or the smart phone). The RFID tag 101 uses this signal to generate the energy harvesting 108. The RFID tag 101 also uses the RF signal 103 to send its response to the RFID reader 104.

The RFID reader 104 is carried by the user and may be either a conventional RFID reader or a smart phone equipped with near-field communication (NFC). The RFID reader 104 communicates (sends and receives data) with the RFID tag 101 using RFID communication protocol. Currently, there are several conventional (traditional) RFID readers and smart phones compatible with the RFID communication protocol and can operate at different frequency bands that are dedicated to RFID communication. Various bands such as low frequency LF (125 KHz to 135 KHz), high frequency HF (13.56 MHz and 433 MHz), ultra high frequency UHF (860 to 960 MHz), and microwave frequency MW (2.4 GHz to 2.4835 GHz and 5.8 GHz) bands are used by the applicant for this invention. It should be understood that a smart phone application is used in this invention so that the user can operate the smart RFID electrical unit system 100 for the electrical units 114 (i.e. the user can use the application to turn ON (or turn OFF) the electrical unit 114, set (or change) the password of the RFID tag 101, change the password stored on the memory of the microcontroller of the control unit 109, save the user's information on the RFID tag 101, add more users, etc.).

The control unit 109 comprises a microcontroller and some other electronic components such as resistors, capacitors, transistors, diodes, inductors, etc. The control unit 109 is integrated with the printed circuit board (PCB) of the system 100 attached to the internal frame of the electrical unit 114. The control unit 109 is held on Low Power Mode (i.e. the control unit 109 operates at the sleeping mode) all the time for saving power. The control unit 109 is only activated (woken up) by the energy harvesting 108 when the user taps the RFID tag 101 with the RFID reader 104. Upon activation, the control unit 109 reads the data sent by the RFID reader 104 (the traditional RFID reader or the smart phone) from the RFID microchip 107 of the RFID tag 100. The control unit 109 then responds to the received data by taking the corresponding action. This action may be either sending a control signal (a logic zero voltage or a logic one voltage) to the relay unit 113 to activate (or deactivate) the electrical unit 114, sending information to the RFID reader 104, saving information (such as changing the password on the memory of its microcontroller), or performing a combination of the three mentioned actions. The control unit 109 is powered by the voltage regulator unit 112.

It should be understood that the control unit 109 may also be woken up, when it is held on sleeping mode, by several other events in addition to the energy harvesting 108, such as a device reset, a watchdog timer, or any peripheral module (external interrupt, change on port pin, comparators, A/D converters, Timers, LCD, etc.). This wake-up feature is used when the electrical unit 114 is programmed, by the user through the RFID reader 104, to be activated (or deactivated), for example, either for a certain time or for a certain time each day. For example, this wake-up feature can be used by parents to set a daily (or weekly) schedule time for their kids to use electronic devices.

The relay unit 113 is used by the control unit 109 to control the connection mechanism of the electrical unit 114. The relay unit 113 comprises a relay and Darlington transistors; it may also comprise diodes, capacitors, resistors, and transistors. The relay of the relay unit 113 has a common pin and two contacts pins for the high voltage (110-380 v); a normally closed (N.C) contact and a normally open (N.O) contact. The common pin is connected with the electrical unit 114 and one of the contacts pins (N.C or N.O) is connected with the Hot (Line) wire of the electrical power supply 110. The hot wire is the wire that carries electrical current from the electrical power supply 110. The relay of relay unit 113 also has two coil pins for the low voltage (5 v, 6 v, 9 v, 12 v, or 24 v) pins that are used to power (activate) the relay. This low voltage is provided to the relay unit 113 by the AC-DC converter unit 111. If the control signal received by the relay unit 113 is a logic zero voltage and the normally closed (N.C) contact of the relay is connected to the Hot (Line) wire of the electrical power supply 110, the relay unit 113 places the electrical unit 114 at the first state (activated). If the control signal received by the relay unit 113 is a logic zero voltage and the normally open (N.O) contact of the relay is connected to the Hot (Line) wire of the electrical power supply 110, the relay unit 113 places the electrical unit 114 at the second state (deactivated). If the control signal received by the relay unit 113 is a logic one voltage and the normally closed (N.C) contact of the relay is connected to the Hot (Line) wire of the electrical power supply 110, the relay unit 113 places the electrical unit 114 at the second state (deactivated). If the control signal received by the relay unit 113 is a logic one voltage and the normally open (N.O) contact of the relay is connected to the Hot (Line) wire of the electrical power supply 110, the relay unit 113 places the electrical unit 114 at the first state (activated).

The electrical power supply 110 may be any adequate electrical power supply (110-380 v) that provides the required AC voltage for the smart RFID electrical unit system 100. The Neutral and the Ground lines of the electrical power supply 110 are connected to both the electrical unit 114 and the AC-DC converter unit 111, whereas the Hot (Line) wire of the electrical power supply 110 is connected to both the AC-DC converter unit 111 and the relay unit 113. It should be understood that any electrical power supply that has only two wires, Hot (Line) wire and Neutral wire, may also be used as an electrical power supply 110 to provide the required power to the smart RFID electrical unit system 100. In this case, the Neutral wire is connected to both the electrical unit 114 and the AC-DC converter unit 111, whereas the Hot (Line) wire is connected to both the AC-DC converter unit 111 and the relay unit 113.

The AC-DC converter unit 111 may be any adequate AC-DC converter circuit that transforms the high AC voltage (110-380 v) to low DC voltage (5, 6, 9, 12, or 24 v). The AC-DC converter unit comprises an electrical transformer that transforms a high AC voltage to a low AC voltage, and rectifiers that convert the low AC voltage to a low DC voltage. It should be understood that any DC voltage rectifiers (5, 6, 9, 12, or 24 v) can be used by the smart RFID electrical unit system 100 provided that the relay of the relay unit 113 is carefully selected so that it can handle this DC voltage (i.e. the DC voltage of the rectifiers is in the DC voltage range of the coil of the relay). The AC-DC converter unit 111 provides both the voltage regulator unit 112 and the relay unit 113 (the coil pins of the relay) with the required power (DC voltage).

The voltage regulator unit 112 may be any adequate voltage regulator circuit in which its output DC voltage is regulated at the desired DC voltage. The voltage regulator unit 112 may be an integrated circuit IC or any other electronic circuit that comprises resistors, transistors, capacitors, and diodes. The voltage regulator unit 112 provides the control unit 109 with the required power (3.3 v or 5 v) to operate its electronic components.

The electrical unit 114 may be an outlet (a receptacle or an extension cord), a switch, a dimmer, a circuit breaker, a USB charging port, or a combination of all of them. The outlets, switches, dimmers, USB charging ports, circuit breakers may be single, duplex (double), triple, quadruple, quintuple, sextuple, septuple, octuple, or n-tuple. The electrical unit 114 comprises an external frame (a plate or a cover) and an internal body which is installed on an outlet box. The internal body of the electrical unit 114 comprises the printed circuit board (PCB) of the units of the smart RFID electrical unit system 100, and it may provide a socket for the attachment of a plug, a switch, a dimmer, a USB, and a circuit breaker. The electrical unit 114 has a connection mechanism having a first state in which the electrical unit 114 is activated (turned ON) and a second state in which the electrical unit 114 is deactivated (turned OFF).

The electrical unit 114 is controlled by the control unit 109 through the relay unit 113. When the user taps the RFID tag 101 with RFID reader 104, or brings the reader sufficiently close to the tag, the RFID tag 101 responds to the RFID reader 104 only if the RFID reader 104 has the authorization required to communicate with the RFID tag 101. When the user taps the RFID tag 101 with RFID reader 104, data is sent from the RFID reader 104 to the RFID tag 101 through the RF signal 103. The RFID tag 101 gets activated by the RF signal 103, and generates energy harvesting 108 that powers up RFID microchip 107 and wakes up the control unit 109. The RFID tag 101 then compares the memory of its microchip 107 with the data received from RFID reader 104 to see whether RFID reader 104 has the authority to communicate with the RFID tag 101. The RFID tag 101 responds to the data sent by the RFID reader 104 only if the RFID reader 104 isauthorized. If the RFID reader 104 is authorized and the data includes a change of the password of the RFID tag 101, the RFID tag 101 saves the new password on the memory of RFID microchip 107. If the RFID reader 104 is authorized and the data is saved on the memory of the RFID microchip 107 at the locations specified for the control unit 109, the RFID tag 101 passes the data to the control unit 109 when requested. Upon receiving the data sent by the RFID tag 101, the control unit 109 processes the data by first checking whether the data includes the correct password required to operate the control unit 109. If not, the control unit 109 takes no action. If the date includes the correct password, the control unit 109 processes the data and responds by taking the corresponding action. This action may be either sending a control signal (a logic zero voltage or a logic one voltage) to the relay unit 113 to activate (or deactivate) the electrical unit 114, sending information to the RFID reader 104, saving information (such as a new password), or performing a combination of the three above-mentioned actions. If the corresponding action is to activate (or deactivate) the electrical unit 114, the control unit 109 sends a control signal to the relay unit 113. If the control signal received by the relay unit 113 is a logic zero voltage and the normally closed (N.C) contact of the relay is connected to the Hot (Line) wire of the electrical power supply 110, the relay unit 113 places the electrical unit 114 at the first state (activated), If the control signal received by the relay unit 113 is a logic zero voltage and the normally open (N.O) contact of the relay is connected to the Hot (Line) wire of the electrical power supply 110, the relay unit 113 places the electrical unit 114 at the second state (deactivated). If the control signal received by the relay unit 113 is a logic one voltage and the normally closed (N.C) contact of the relay is connected to the Hot (Line) wire of the electrical power supply 110, the relay unit 113 places the electrical unit 114 at the second state (deactivated). If the control signal received by the relay unit 113 is a logic one voltage and the normally open (N.O) contact of the relay is connected to the Hot (Line) wire of the electrical power supply 110, the relay unit 113 places the electrical unit 114 at the first state (activated). Once the control unit 109 activates or deactivates the electrical unit 114, the microcontroller of the control unit 109 resets the memory locations of the RFID microchip 107 specified for the control unit 109 to zeros, and returns back to the sleeping mode (to save power) until it is woken up again by tapping the RFID tag 101 with the RFID reader 104. If the data received by the control unit 109 includes instructions for activating (deactivating) the electrical unit 114 after a period of time (or at a scheduled time over a specific period), the control unit 109 adjusts its microcontroller so that the control unit 109 is woken up at the required time to activate (or deactivate) the electrical unit 114 as instructed.

It should be understood that the smart RFID electrical unit system 100 may be used for controlling the ON/OFF state of any electrical unit 114 in any building. For example, the smart RFID electrical unit system 100 may be used for controlling the ON/OFF state of any outlet (receptacle or extension cord), switch, dimmer, USB charging port, and circuit breaker in any building.

Figure 2:
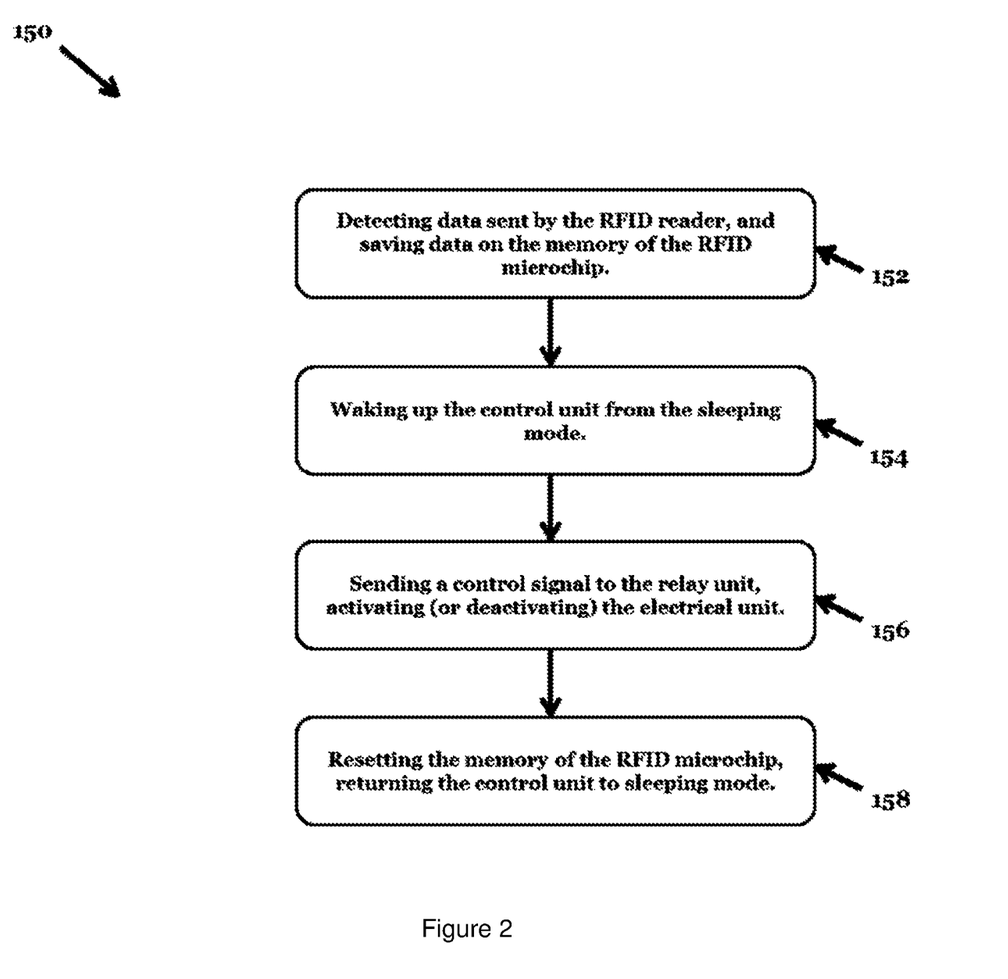
FIG. 2 is a flow chart illustrating a method for operating the smart RFID electrical unit system for controlling the opearation of electrical units, in accordance with an embodiment.

FIG. 2 illustrates one embodiment of a method 150 for operating the smart RFID electrical unit system 100 for electrical units (outlets, switches, dimmers, USB charging ports, and circuit breakers). The method 150 includes a first step 152 that comprises detecting the data sent by the RFID reader 104 using electromagnetic waves or Radio Frequency signals 103 when the user taps the RFID tag 101 with the RFID reader 104. Upon detection of the data by the RFID tag 101, the RFID tag 101 generates energy harvesting 108, powers up RFID microchip 107, and saves the data on the memory of RFID microchip 107. It should be understood that step 152 does not substantially require any electrical power from the electrical power supply 110 as the power required to activate the RFID microchip 107 is generated by the RFID tag 101 from the RF signal 103 emitted by the RFID reader 104. The energy harvesting 108 then wakes up the control unit 109 from the sleeping mode at step 154.

At step 156, the control unit 109 reads the data from the memory of the RFID microchip 107, and sends a control signal (a logic zero voltage or a logic one voltage) to the relay unit 113, thereby connecting the Hot (Line) wire of the electrical power supply 110 to one of the relay's contacts (N.C. contact or N.O. contact), and either activating or deactivating the electrical unit 114. A visual and/or audible signal indicator (not shown) may be used to provide the user with the ON/OFF status of the electrical unit 114. At step 158, the control unit 109 resets the memory locations of the RFID microchip 107 specified for the control unit 109 to zeros, and returns to sleep mode to save power and to wait for the next activation of the RFID tag 101.

Figure 3:
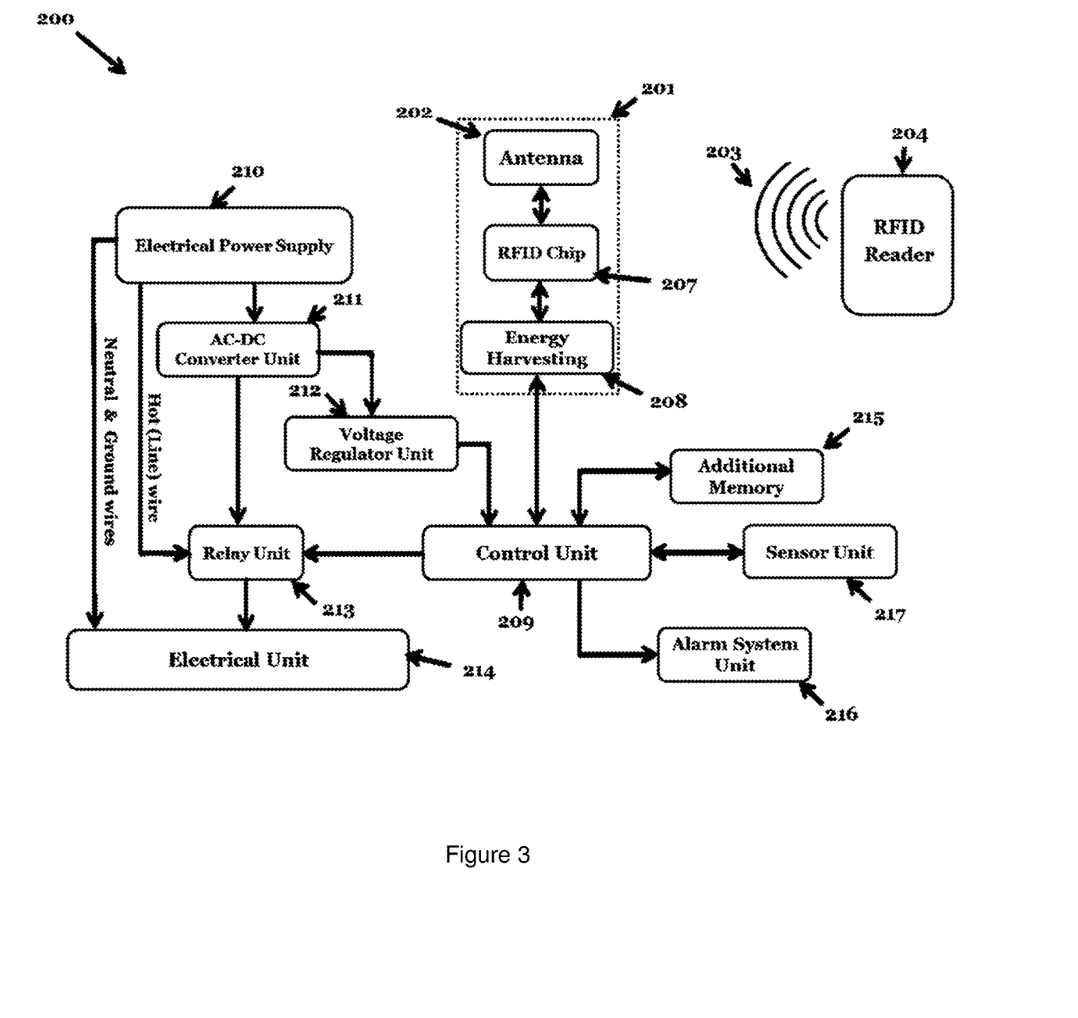
FIG. 3 is a schematic view of the smart RFID electrical unit system for controlling the operation of electrical units in accordance with another embodiment.

FIG. 3 illustrates one embodiment of a smart RFID electrical unit system 200 for controlling operation of electrical units (outlets, switches, dimmers, USB charging ports, and circuit breakers). The smart RFID electrical unit system 200 comprises an electrical unit 214 with a connection mechanism having a first state in which the electrical unit 214 is activated (turned ON) and a second state in which the electrical unit 214 is deactivated (turned OFF). The electrical unit 214 is controlled by a control unit 209 coupled to a relay unit 213, and connected to an alarm system unit 216, an additional memory 215, and a sensor unit 217. The smart RFID electrical unit system 200 further comprises a RFID reader 204 (a conventional RFID reader or a smart phone equipped with near-field communication (NFC)) to communicate (or exchange data) with the control unit 209 through a RFID tag 201, and an electrical power supply 210 connected to an AC-DC voltage converter unit 211 and a voltage regulator unit 212 to provide the smart RFID electrical unit system 200 with the required voltages. RFID tag 201 includes antenna 202, an RFID microchip 207, including memory, and energy harvesting circuits 208.

The sensor unit 217 may be any adequate system (or sensor) that can be used, for example, to monitor power consumption or detect unsafe conditions that may cause a hazard to the safety of the user and to the building as well. Any sensor that may be used to monitor the power consumption or to measure the overheating caused by the extra load on the electrical unit 214 may be considered as one example of sensor unit 217 coupled to control unit 209. When overheating is detected by the sensor unit 217, the control unit 209 sends a control signal to the relay unit 213, placing the electrical unit 214 at the second state (turned OFF). Any sensor that detects the abnormal electric current flowing to the ground may also be considered as another example of the sensor unit 217. Such a sensor can protect the user from electrical shocks caused by faults. When abnormal current flowing to the ground is detected by the sensor unit 217, the control unit 209 places the electrical unit 214 at the second state (turned OFF) via the relay unit 213. A fire-detecting sensor may also be considered as another example of the sensor unit 217 coupled to the control unit 209. When a fire is detected, the control unit 209 deactivates the electric unit 214 via the relay unit 213, placing it at the second state (turned OFF).

The alarm system unit 216 may be any adequate alarm system that can be used to provide an early warning for emergency so that actions can be taken by the user to prevent possible hazards. The alarm system unit 216 may be a light indicator, a sound indicator, or both of them. The alarm system unit 216 is coupled to the control unit 209. In case that the sensor unit 217 detects any unsafe condition that may cause a hazard, the control unit 209 places the electrical unit 214 at the second state (turned OFF), and operates the alarm system unit 216 so that the user can take an action to prevent possible hazards.

The additional memory 215 may be any external memory that can be used to save data. The additional memory 215 is coupled to the control unit 209, and it is used by the microcontroller of the control unit 209 to save data when the memory of control unit 209 is insufficient. It should be understood that the additional memory 215 may only be implemented when more information about authorized users must be recorded (for example, when a high level of security is required). The data to be saved may include the identity of the users who used their authorized RFID readers 204 to activate (or deactivate) the electrical unit 214, and the date and time of the access to the smart RFID electrical unit system 200.

The electrical unit 214 is controlled by the control unit 209 through the relay unit 213. When the RFID tag 201 is tapped by the RFID reader 204 (or the reader is brought sufficiently close to the tag), data is sent through a RF signal 203 by the RFID reader 204 to the RFID tag 201. The RFID tag 201 gets activated by the RF signal 203, and generates energy harvesting 208 that powers up RFID microchip 207 and wakes up the control unit 209. The RFID tag 201 compares the ID of the RFID reader 204 contained in the data to a list of authorized IDs saved on the memory of microchip 207. If the ID is on the list (valid), the RFID tag 201 responds to the data sent by the RFID reader 204. If the data contains instructions to change the password of the RFID tag 201, the RFID tag 201 saves the new password on the memory of RFID microchip 207. If not, the RFID tag 201 passes the data to the control unit 209 when requested. Upon receiving the data sent by the RFID tag 201, the control unit 209 may check if the RFID reader 204 has the authorization to operate the control unit 209. The control unit 209 then responds to the data by taking the corresponding action. This action may be either sending a control signal to the relay unit 213, sending information to the RFID reader 204, saving information on the memory of the microcontroller of the control unit 209 or on the additional memory 215, or performing a combination of all the above-mentioned actions. If the corresponding action is to send a control signal to the relay unit 213, the control signal will be either a logic zero voltage or a logic one voltage. If the control signal received by the relay unit 213 is a logic zero voltage and the normally closed (N.C) contact of the relay is connected to the Hot (Line) wire of the electrical power supply 210, the relay unit 213 places the electrical unit 214 at the first state (activated). If the said control signal received by the relay unit 213 is a logic zero voltage and the normally open (N.O) contact of the relay is connected to the Hot (Line) wire of the electrical power supply 210, the relay unit 213 places the electrical unit 214 at the second state (deactivated). If the said control signal received by the relay unit 213 is a logic one voltage and the normally closed (N.C) contact of the relay is connected to the Hot (Line) wire of the electrical power supply 210, the relay unit 213 places the electrical unit 214 at the second state (deactivated). If the said control signal received by the relay unit 213 is a logic one voltage and the normally open (N.O) contact of the relay is connected to the Hot (Line) wire of the electrical power supply 210, the relay unit 213 places the electrical unit 214 at the first state (activated). However, if the status of sensor unit 217 is abnormal, that is, if overheating exists because of an overload of the electrical unit 214, abnormal current flows to ground because of a fault, and/or a fire is detected, the control unit 209 sends a control signal to relay unit 213 placing the electrical unit 214 in the second state—turned OFF. Once the electrical unit 214 is activated (or deactivated), the microcontroller of the control unit 209 resets the memory locations of the RFID microchip 207 specified for the control unit 209 to zeros, and goes back to the sleeping mode (to save power) until the user re-taps the RFID tag 201 with RFID reader 204. Control unit 109 may also be woken up, when it is held on sleeping mode, by several other events in addition to the energy harvesting 108, such as a device reset, a watchdog timer, or any peripheral module (external interrupt, change on port pin, comparators, A/D converters, Timers, LCD, etc.). If the data received by the control unit 209 includes activating (deactivating) the electrical unit 214 after a period of time (or at a scheduled time over a specific period), the control unit 209 is adjusted so that the control unit 209 is woken up at the required time to activate (or deactivate) the electrical unit 214 as requested.

According to one aspect then, there is provided a smart RFID electrical unit system for electrical units (outlets, switches, dimmers, USBs, and circuit breakers), the system comprising: an electrical power supply to provide the system with the required AC voltage; an AC-DC voltage converter unit coupled to a voltage regulator unit to provide the system with the required DC voltages; an electrical unit having a first state in which the electrical unit is activated (turned ON) and a second state in which the electrical unit is deactivated (turned OFF); a control unit coupled to a relay unit for controlling the connection mechanism of the electrical unit, placing the electrical unit at one of the first and the second state; a RFID reader to communicate and exchange data with the RFID tag; and a RFID tag coupled to the control unit, the RFID tag detecting any data (electromagnetic waves or Radio Frequency signals) sent by the RFID reader and, upon detection of the said data, producing energy harvesting that powers up the RFID microchip of the RFID tag and wakes up the control unit coupled to the relay unit from the sleeping mode, the RFID microchip, upon being powered up, saving the said data on its memory, the control unit, upon being woken up, reading the said data from the memory of the RFID microchip and, providing a control signal (a logic zero voltage or a logic one voltage) to the relay unit, thereby connecting one of the relay's contacts (N.C contact or N.O contact) to the Hot (Line) wire of the electrical power supply and, upon said connection, placing the electrical unit in one of the first state and the second state (activating or deactivating the electrical unit) and, returning the control unit to operate in the sleeping mode to save power and to wait for the next activation of the RFID tag.

In the system, upon powering up the RFID microchip, the RFID tag further compares the ID of the RFID reader with a list of the authenticated RFID readers saved on the memory of the RFID microchip. If the ID of the RFID reader is valid, the RFID tag saves the said data on the memory of the RFID microchip at the locations specified by the RFID reader. If the said data is saved at the locations specified for the authentication list, the RFID tag adds a new user to the list of the authenticated RFID readers. If the said data is saved at the location specified for the password, the RFID tag changes the password used by the authenticated RFID readers to communicate with the RFID tag. If the said data is saved at the location specified for activating/deactivating the authentication property, the RFID tag activates (or deactivates) the authentication property. If the said data is saved at the locations specified for the control unit, the microcontroller of the control unit reads the said data from the memory of the RFID microchip, and checks if the password required by the microcontroller of the control unit is included with the said data. If the password is not included with the said data, the control unit takes no action, and the electrical unit keeps operating at its current state. If the password is included with the said data, the microcontroller of the control unit further checks whether the said data is to change the state of the electrical unit (turn ON or turn OFF) or to change the password of the microcontroller. If the said data is to change the password of the microcontroller of the control unit, the microcontroller saves the new password on its memory. If the said data is to change the state of the electrical unit, the control unit provides a control signal to the relay unit. If the control signal is a logic zero voltage and the N.C contact of the relay of the relay unit is connected to the Hot (Line) wire of the electrical power supply unit, the control signal causes the relay unit to place the electrical unit at its first state (turned ON). If the control signal is a logic zero voltage and the N.O contact of the relay of the relay unit is connected to the Hot (Line) wire of the electrical power supply unit, the control signal causes the relay unit to place the electrical unit at its second state (turned OFF). If the control signal is a logic one voltage and the N.C contact of the relay of the relay unit is connected to the Hot (Line) wire of the electrical power supply unit, the control signal causes the relay unit to place the electrical unit at its second state (turned OFF). If the control signal is a logic one voltage and the N.O contact of the relay of the relay unit is connected to the Hot (Line) wire of the electrical power supply unit, the control signal causes the relay unit to place the electrical unit at its first state (turned ON). Upon turning ON (or turning OFF) the electrical unit, the microcontroller of the control unit resets the memory locations of the RFID microchip specified for the control unit to zeros, and checks if the said data sent by the RFID user is to keep the current state of the electrical unit either for a specific period of time or for a certain time each day. If the current state of the electrical unit is set by the user to operate for a certain time, the microcontroller of the control unit sets one of its interrupts to change the current state of the electrical unit to the other state at the required time. Upon activating (or deactivating) the electrical unit and setting the required interrupts if needed, the microcontroller of the control unit places the control unit at the sleeping mode to save power. If the ID of the RFID reader is invalid, no data is saved on the memory of the RFID microchip, and no action is taken by the control unit as the data stored at the memory locations specified for the control unit in the RFID microchip is still zeros, thus the electrical unit keeps operating at its current state. The RFID tag detecting the data (electromagnetic waves or RF signals) sent by the RFID reader consumes substantially no electrical energy. The RFID reader may be a conventional RFID reader or a NFC-enabled smart phone with an application that gives the user the ability to function the smart RFID electrical unit system. The electrical unit may be an outlet (receptacle or an extension cord), a switch, a dimmer, a USB, or a circuit breaker, the electrical unit may include a light indicator (LED) to provide its operating state. The electrical power supply is any adequate electrical power supply 110-380 v that has either two wires (Hot "or Line" wire and Neutral wire) or three wires (Hot "or Line" wire, Neutral wire, and Ground wire). The system further including a light indicator to indicate the status of the electrical unit.

In accordance with another aspect, there is provided a control system for controlling a smart RFID electrical unit (an outlet, a switch, a dimmer, a USB, a circuit breaker, or a combination of them), the electrical unit comprises an electrical power supply to provide the AC voltage required by the system, an AC-DC voltage converter unit coupled to a voltage regulator unit to provide the system with the required DC voltages, and an electrical unit connection mechanism having a first state in which the electrical unit is activated (turned ON) and a second state in which the electrical unit is deactivated (turned OFF), the control system comprising; a control unit coupled to a relay unit for controlling the connection mechanism of the electrical unit, placing the electrical unit at one of the first and the second state; a sensor unit coupled to the control unit for monitoring power usage and detecting unsafe conditions that may cause a hazard; an alarm system coupled to the control unit for providing an early warning to prevent possible hazards; an additional memory coupled to the control unit to save more data; a RFID reader to communicate and exchange data with the RFID tag; and a RFID tag coupled to the control unit, the RFID tag detecting any data (electromagnetic waves or Radio Frequency signals) sent by the RFID reader and, upon detection of the said data, generating energy harvesting that powers up the RFID microchip of the RFID tag and wakes up the control unit coupled to the relay unit from the sleeping mode, the RFID microchip, upon being powered up, saving the said data on its memory, the control unit, upon being woken up, reading the said data from the memory of the RFID microchip and, providing a control signal (a logic zero voltage or a logic one voltage) to the relay unit, thereby connecting one of the relay's contacts (N.C contact or N.O contact) to the Hot (Line) wire of the electrical power supply and, upon said connection, placing the electrical unit in one of the first state and the second state (activating or deactivating the electrical unit) and, returning the control unit to operate in the sleeping mode to save power and to wait for the next activation of the RFID tag.

In the system, upon powering up the RFID microchip, the RFID tag further compares the ID of the RFID reader with a list of the authenticated RFID readers saved on the memory of the RFID microchip. If the ID of the RFID reader is valid, the RFID tag saves the said data on the memory of the RFID microchip at the locations specified by the RFID reader. If the said data is saved at the locations specified for the authentication list, the RFID tag adds a new user to the list of the authenticated RFID readers. If the said data is saved at the location specified for the password, the RFID tag changes the password used by the authenticated RFID readers to communicate with the RFID tag. If the said data is saved at the location specified for activating/deactivating the authentication property, the RFID tag activates (or deactivates) the authentication property. If the said data is saved at the locations specified for the control unit, the microcontroller of the control unit reads the said data from the memory of the RFID microchip, and checks if the password required by the microcontroller of the control unit is included with the said data. If the password is not included with the said data, the control unit takes no action, and the electrical unit keeps operating at its current state. If the password is included with the said data, the microcontroller of the control unit further checks whether the said data is to change the state of the electrical unit (turn ON or turn OFF) or to change the password of the microcontroller. If the said data is to change the password of the microcontroller of the control unit, the microcontroller saves the new password on its memory. If the said data is to change the state of the electrical unit, the control unit provides a control signal to the relay unit. If the control signal is a logic zero voltage and the N.C contact of the relay of the relay unit is connected to the Hot (Line) wire of the electrical power supply unit, the control signal causes the relay unit to place the electrical unit at its first state (turned ON). If the control signal is a logic zero voltage and the N.O contact of the relay of the relay unit is connected to the Hot (Line) wire of the electrical power supply unit, the control signal causes the relay unit to place the electrical unit at its second state (turned OFF). If the control signal is a logic one voltage and the N.C contact of the relay of the relay unit is connected to the Hot (Line) wire of the electrical power supply unit, the control signal causes the relay unit to place the electrical unit at its second state (turned OFF). If the control signal is a logic one voltage and the N.O contact of the relay of the relay unit is connected to the Hot (Line) wire of the electrical power supply unit, the control signal causes the relay unit to place the electrical unit at its first state (turned ON). Upon turning ON (or turning OFF) the electrical unit, the microcontroller of the control unit resets the memory locations of the RFID microchip specified for the control unit to zeros, and checks if the said data sent by the RFID user is to keep the current state of the electrical unit either for a specific period of time or for a certain time each day. If the current state of the electrical unit is set by the user to operate for a certain time, the microcontroller of the control unit sets one of its interrupts to change the current state of the electrical unit to the other state at the required time. Upon activating (or deactivating) the electrical unit and setting the required interrupts if needed, the microcontroller of the control unit places the control unit at the sleeping mode to save power. If the ID of the RFID reader is invalid, no data is saved on the memory of the RFID microchip, and no action is taken by the control unit as the data stored at the memory locations specified for the control unit in the RFID microchip is zeros, thus the electrical unit keeps operating at its current state. The RFID tag detecting the data (electromagnetic waves or RF signals) sent by the RFID reader consumes substantially no electrical energy. The RFID reader may be a conventional RFID reader or a NFC-enabled smart phone with an application that gives the user the ability to function the smart RFID electrical unit system. The electrical power supply is any adequate electrical power supply 110-380 v that has either two wires (Hot "or Line" wire and Neutral wire) or three wires (Hot "or Line" wire, Neutral wire, and Ground wire). The system including a light indicator to indicate the status of the electrical unit. The system including a sensor unit to monitor power usage and to provide an early warning to prevent possible hazards, wherein the sensor unit is selected from the group consisting of heat sensors, electric current flow sensors, and combinations thereof. The system further including an alarm system unit coupled with a sensor unit to prevent possible hazards caused by faults or misusing of electrical units, wherein the alarm system is selected from the group consisting of light alarm systems, sound alarm systems, and combinations thereof.

In accordance with a further aspect, there is provided a method for controlling a smart RFID electrical unit (an outlet, a switch, a dimmer, a USB, a circuit breaker, or a combination of them), the method comprising: detecting any data (electromagnetic waves or Radio Frequency signals) sent by the RFID reader when the user taps the RFID tag by their RFID reader, and upon detection of the said data by the RFID tag, the RFID tag generates an energy harvesting, powers up its RFID microchip, and saves the said data on the memory of its RFID microchip; upon producing an energy harvesting, waking up the control unit from the sleeping mode; upon said waking up, reading the data from the memory of the RFID microchip, and providing a control signal (a logic zero voltage or a logic one voltage) to the relay unit, thereby connecting the Hot (Line) wire of the electrical power supply to one of the relay's contacts (N.C contact or N.O contact), placing the electrical unit in one of the first state and the second state (activating or deactivating the electrical unit); and returning the control unit returns to operate in the sleeping mode to save power and to wait for the next activation of the RFID tag by the user.

In the method, upon powering up the RFID microchip, the RFID tag further compares the ID of the RFID reader with a list of the authenticated RFID readers saved on the memory of the RFID microchip. If the ID of the RFID reader is valid, the RFID tag saves the said data on the memory of the RFID microchip at the locations specified by the RFID reader. If the said data is saved at the locations specified for the authentication list, the RFID tag adds a new user to the list of the authenticated RFID readers. If the said data is saved at the location specified for the password, the RFID tag changes the password used by the authenticated RFID readers to communicate with the RFID tag. if the said data is saved at the location specified for activating/deactivating the authentication property, the RFID tag activates (or deactivates) the authentication property. If the said data is saved at the locations specified for the control unit, the microcontroller of the control unit reads the said data from the memory of the RFID microchip, and checks if the password required by the microcontroller of the control unit is included with the said data. If the password is not included with the said data, the control unit takes no action, and the electrical unit keeps operating at its current state. If the password is included with the said data, the microcontroller of the control unit further checks whether the said data is to change the state of the electrical unit (turn ON or turn OFF) or to change the password of the microcontroller. If the said data is to change the password of the microcontroller of the control unit, the microcontroller saves the new password on its memory. If the said data is to change the state of the electrical unit, the control unit provides a control signal to the relay unit. If the control signal is a logic zero voltage and the N.C contact of the relay of the relay unit is connected to the Hot (Line) wire of the electrical power supply unit, the control signal causes the relay unit to place the electrical unit at its first state (turned ON). If the control signal is a logic zero voltage and the N.O contact of the relay of the relay unit is connected to the Hot (Line) wire of the electrical power supply unit, the control signal causes the relay unit to place the electrical unit at its second state (turned OFF). If the control signal is a logic one voltage and the N.C contact of the relay of the relay unit is connected to the Hot (Line) wire of the electrical power supply unit, the control signal causes the relay unit to place the electrical unit at its second state (turned OFF). If the control signal is a logic one voltage and the N.O contact of the relay of the relay unit is connected to the Hot (Line) wire of the electrical power supply unit, the control signal causes the relay unit to place the electrical unit at its first state (turned ON). Upon turning ON (or turning OFF) the electrical unit, the microcontroller of the control unit resets the memory locations of the RFID microchip specified for the control unit to zeros, and checks if the said data sent by the RFID user is to keep the current state of the electrical unit either for a specific period of time or for a certain time each day. If the current state of the electrical unit is dominated by a period of time, the microcontroller of the control unit sets one of its interrupt to change the current state of the electrical unit to the other state at the required time. Upon activating (or deactivating) the electrical unit and setting the required interrupts if needed, the microcontroller of the control unit places the control unit at the sleeping mode to save power. If the ID of the RFID reader is invalid, no data is saved on the memory of the RFID microchip, and no action is taken by the control unit as the data stored at the memory locations specified for the control unit in the RFID microchip is zeros, thus the electrical unit keeps operating at its current state. The RFID tag detecting the data (electromagnetic waves or RF signals) sent by the RFID reader consumes substantially no electrical energy. The RFID reader may be a conventional RFID reader or a NFC-enabled smart phone with an application that gives the user the ability to function the smart RFID electrical unit system.

The invention claimed is:

1. A radio frequency identification (RFID) system for controlling operation of an electrical unit between a first state and a second state, the RFID system comprising:
   a RFID tag comprising a RFID microchip including memory, at least one antenna for receiving radio frequency (RF) signals, and energy harvesting circuits for generating electrical energy from the RF signals to power the RFID tag, the RF signals including data;
   a control unit coupled to the RFID tag, the control unit including a microcontroller and memory;
   a relay unit connected to the control unit and to the electrical unit; and
   at least one external RFID reader including functionality for generating the RF signals and the data when the RFID reader is placed in close proximity to the RFID tag,
   wherein the RFID microchip includes functionality for processing the data, saving the data on the memory of the RFID microchip and sending a wakeup signal to the control unit,
   wherein the control unit includes functionality capable of reading the data from the memory of the RFID microchip, processing the data and sending a control signal to the relay unit in accordance with instructions contained in the data, the relay unit operating the electrical unit between the first state and the second state in response to the control signal.

2. The RFID system of claim 1, wherein the RFID tag is a passive RFID tag having no internal or external electric power source connected thereto.

3. The RFID system of claim 1, wherein the RFID tag is selected from the group consisting of a passive RFID tag having no internal or external electric power source connected thereto, an active RFID tag, and a semi-active RFID tag.

4. The RFID system of claim 1, wherein the RFID reader is a mobile device enabled with near filed communication (NFC).

5. The RFID system of claim 1, wherein the at least one antenna is selected from the group consisting of a loop antenna, a coil antenna, a dipole antenna, a slot antenna, and a patch antenna.

6. The RFID system of claim 1, wherein the data generated by the RFID reader includes a password and a RFID reader ID and the RFID microchip includes functionality capable of comparing the password received from the RFID reader to a RFID tag password stored in the memory of the RFID microchip, and the RFID microchip includes functionality capable of comparing the RFID reader ID to a list of authorized IDs stored in the memory of the RFID microchip, wherein if the password received from the RFID reader matches the RFID tag password and if the RFID reader ID matches one of the list of authorized IDs, the RFID microchip stores the data in one or more specified locations in the memory of the RFID microchip.

7. The RFID system of claim 6, wherein the control unit includes functionality capable of comparing the password received from the RFID reader to a control unit password, wherein if the password received from the RFID reader matches the control unit password, the control unit performs a function specified in the data.

8. The RFID system of claim 7, wherein the function is selected from the group of functions consisting of sending the control signal to the relay unit, sending information back to the RFID reader, saving the data in the memory of the control unit, changing the control unit password, and combinations thereof.

9. The RFID system of claim 1, including a connection to an external power supply and means for providing power to the control unit, the relay unit and the electrical unit.

10. The RFID system of claim 9, wherein the means for providing power to the relay unit includes an AC-DC converter and the means for supplying power to the control unit includes the AC-DC converter and a voltage regulator.

11. The RFID system of claim 1, wherein the RF signals are selected from the group consisting of low frequency RF signals, high frequency RF signals, ultra-high frequency RF signals, and microwave signals.

12. The RFID system of claim 1, wherein the RFID tag includes at least two antennas.

13. The RFID system of claim 6, wherein the RFID reader includes functionality capable of updating the RFID tag password by including a change password command in the data.

14. The RFID system of claim 1, wherein the RFID reader includes functionality to include RFID reader identity information in the data, and the RFID microchip includes functionality to read the RFID reader identity information and store the RFID reader identity information in the memory of the RFID microchip.

15. The RFID system of claim 1, wherein the RFID reader includes functionality to include at least one time and date in the data, and the RFID microchip includes functionality to read the at least one time and date and store the at least one time and date in the memory of the RFID microchip, and the control unit includes functionality to read the at least one time and date and send the control signal to the relay unit at the at least one time and date.

16. The RFID system of claim 1, further including a sensor unit connected to the control unit, the sensor unit including functionality for monitoring a condition of the electrical unit and for causing the control unit to send the control signal to the relay unit when the condition is deemed to be abnormal, the control signal causing the relay unit to place the electrical unit into the second state, wherein the second state is a turned-off state.

17. The RFID system of claim 16, wherein the sensor unit is selected from the group consisting of an electric current flow sensor, a power consumption sensor, a heat sensor, and a fire sensor, and combinations thereof.

18. A method for controlling operation of an electrical unit between a first state and a second state, the method comprising:
- providing a RFID tag comprising a RFID microchip including memory, at least one antenna, and energy harvesting circuits;
- connecting the RFID tag to a control unit, the control unit including a microcontroller and memory;
- connecting a relay unit to the control unit and to the electrical unit;
- generating RF signals using an external RFID reader placed in close proximity to the RFID tag, the RF signals including data;
- using the energy harvesting circuits to generate electrical energy from the RF signals to power the RFID tag;
- using the RFID microchip to process the data, save the data on the memory of the RFID microchip, and wake up the control unit,
- upon waking up, reading the data saved on the memory of the RFID microchip into the memory of the control unit and processing the data in the control unit;
- sending a control signal from the control unit to the relay unit in response to the data; and
- operating the electrical unit between the first state and the second state in response to the control signal.

19. The method of claim 18, including:
- connecting a sensor unit to the control unit;
- using the sensor unit to monitor a condition of the electrical unit; and
- the sensor unit causing the control unit to send the control signal to the relay unit when the condition of the electrical unit is deemed to be abnormal, the control signal causing the relay unit to place the electrical unit into the second state, wherein the second state is a turned-off state.

20. The method of claim 19, wherein the sensor unit is selected from the group consisting of an electric current flow sensor, a power consumption sensor, a heat sensor, and a fire sensor, and combinations thereof.

* * * * *